United States Patent Office 2,724,202
Patented Nov. 22, 1955

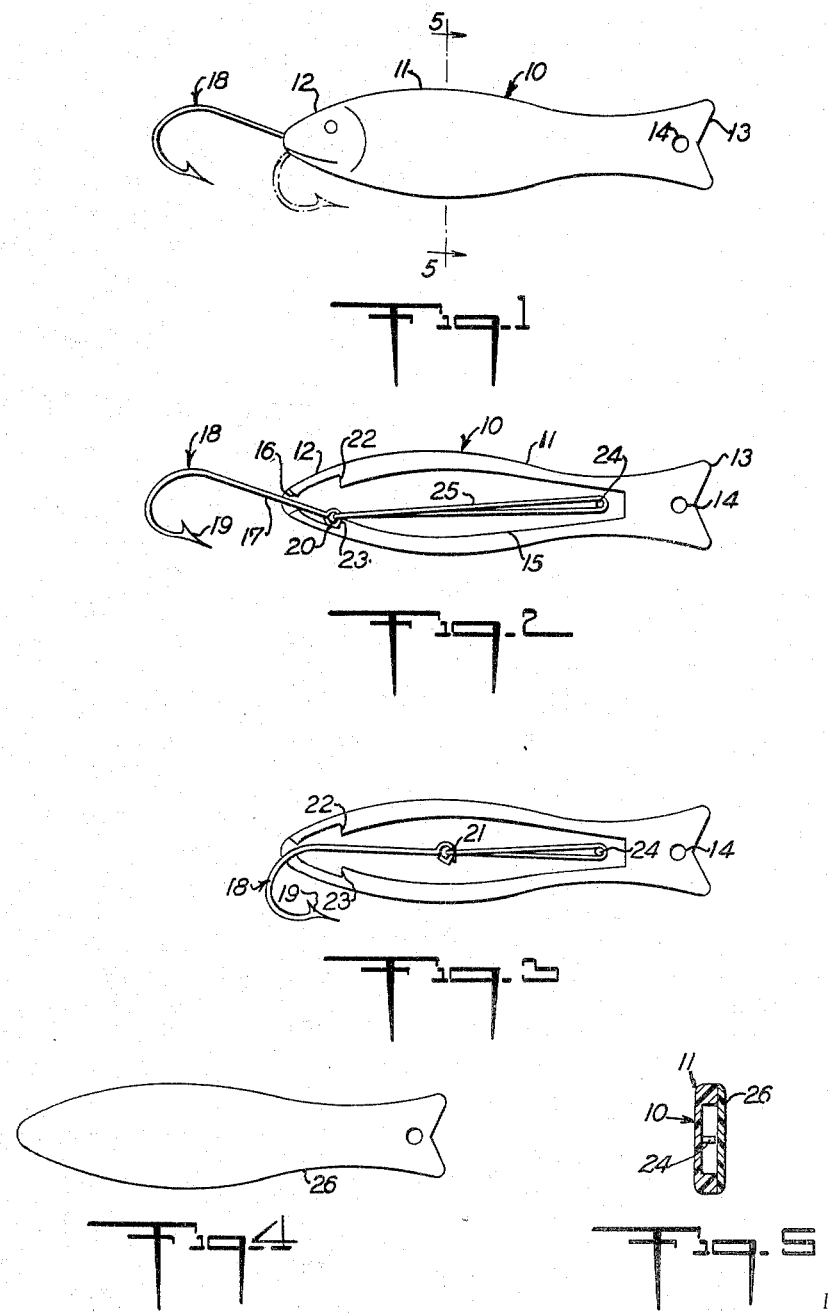

2,724,202

COMBINED FISHING LURE AND HOOK SETTING MECHANISM

Herman S. Heyman, Takoma Park, Md.

Application December 28, 1953, Serial No. 400,567

4 Claims. (Cl. 43—15)

This invention relates to the sport of fishing and more particularly to a fishing lure incorporating means for automatically setting the hook in the fish.

Heretofore, many types of fishing lures have been developed and utilized and certain of these have incorporated means for automatically setting the hook in the fish. These have included springs and similar devices for automatically moving the hook when contacted by a fish, but these have been subject to certain disadvantages, such as rusting and deterioration of the spring with the consequent loss of effectiveness and the difficulty of obtaining replacement springs to effect a proper repair.

It is accordingly an object of the invention to provide a fishing lure which may be economically constructed of plastic or other suitable material and incorporating means for automatically setting a hook in the fish.

A further object of the invention is the provision of a fishing lure incorporating means for automatically setting a hook in the fish and in which the hook may be placed in cocked position and is not subject to displacement or release till contacted by a fish.

Another object of the invention is the provision of a fish lure incorporating automatic means for setting the hook in a fish, which mechanism in no way precludes providing the proper shape and markings for the lure.

A further object of the invention is the provision of a fish lure incorporating automatic means for setting the hook in the fish in which any of the parts subject to breakage or deterioration are easily and economically replaceable.

Further objects and advantages of the invention will be apparent from the following description taken in conjunction with the accompanying drawing wherein:

Fig. 1 is a side elevational view of the fish lure of this invention with the hook in cocked position shown in full lines and in seated position shown in dotted lines;

Fig. 2, a side elevational view with the cover plate removed and showing the hook in cocked position;

Fig. 3, a view similar to Fig. 2, and showing the hook in seated position;

Fig. 4, a side elevational view of the cover plate for the fish lure of this invention; and Fig. 5, a sectional view on the line 5—5 of Fig. 1.

With continued reference to the drawing there is shown a fish lure 10 which may be molded or otherwise formed from plastic or other suitable material and such lure may take the form of a small fish, such as a minnow or may be of any other desired configuration. The fish lure 10 of this invention may well comprise an elongated body 11 having a head portion 12 and a tail portion 13. Adjacent the tail portion 13 an aperture 14 may be provided which serves to receive the line which may be attached to the fish pole or other tackle utilized by the fisherman.

The body 11 may be provided with an elongated internal recess 15 which serves to provide buoyancy for the lure and also to receive the mechanism for automatically setting the hook in the fish. The recess 15 terminates at the head end 12 of the lure 10 in an aperture 16 which is adapted to receive the shank 17 of a hook 18. Hook 18 may be provided with the usual barb 19 and the shank 17 may terminate in an eye 20 which is flattened as at 21 for a purpose to be presently described. The aperture 16 in the head 12 of the body 11 is somewhat smaller than the eye 20 in order to prevent inadvertent removal of the hook 18. A short distance inwardly of the aperture 16 opposed shoulders 22 and 23 project into the recess 15 and these shoulders serve a purpose which will be presently described.

Adjacent the rear end of recess 15, a pin 24 projects from the body 11 and this pin 24 serves to receive one end of a resilient band 25 which may be formed of rubber or other suitable elastic material, the opposite end of this band 25 being engaged in the eye 20 of hook 18.

As best shown in Figs. 4 and 5, a cover plate 26 is provided which serves to close the recess 15 and as shown in Fig. 5, this cover plate 26 is applied to the side of the body 11 of the lure 10 and may be secured in place by cement or any other suitable means.

In operation the hook 18 is pulled outwardly against the action of the elastic band 25 until the flattened eye 20 is positioned in engagement with either the shoulder 22 or the shoulder 23 within the recess 15 of the body 11. The hook 18 then occupies the position shown in full lines in Figs. 1 and 2, and is held against retraction by the elastic band 25 due to engagement of the flattened end 21 of the eye 20 with the shoulder 22 or 23. Upon a fish striking the lure, the eye 20 will be disengaged from the shoulder 22 or 23 and the elastic band 25 will pull the hook 18 inwardly of the lure 10 at a rapid rate and serve to firmly seat the hook in the fish. This retracting action of the hook takes place entirely automatically and prior to any action on the part of the fisherman, since the hook operates immediately upon contact with the fish and before the fisherman could possible exert a sharp upward pull on the line to manually seat the hook.

In the event the elastic band breaks or the hook 18 must be replaced it is only necessary to remove the cover plate 26 and insert a new part as may be required, after which the cover plate 26 may be replaced.

It will be seen that by the above described invention there has been provided an extremely simple and economical fish lure which incorporates automatic means for setting a hook in a fish and furthermore, the hook setting mechanism in no way precludes formation of the lure in any desired shape and the same may be painted or decorated in any desired manner to simulate small fish, such as minnows or any other organism commonly utilized as bait. Furthermore, the construction of the automatic hook setting mechanism is such that the same will not be inadvertently dislodged upon the lure striking the water and since this lure is of the floating type any danger of tripping of the hook setting mechanism by contact with the bottom is, of course, avoided. Inadvertent removal of the hook or stretching of the elastic band beyond the breaking point is prevented and simple replacement of parts is permitted.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A combined fish lure and automatic hook setting mechanism comprising an elongated body of molded material, an elongated recess in said body open at one side, means at the tail end of said lure to receive a line, an aperture in the head end of said lure communicating with said recess, a hook having a shank slidably disposed in said aperture, an eye on the inner end of said shank, a portion of said eye being flattened, said aperture being smaller than said eye to prevent inadvertent removal of said hook from said lure, opposed inwardly projecting shoulders in said recess, a pin extending into said recess, an elastic band connected to said eye and to said pin and a cover plate for said recess whereby said hook may be moved outwardly to tension said band and said flattened portion engaged with one of said shoulders to hold said hook in cocked position and upon contact of a fish with said hook the flattened portion will disengage said shoulder and said hook will be sharply retracted by said band to seat said hook in the fish.

2. A combined fish lure and automatic hook setting mechanism comprising an elongated body, an elongated recess in said body open at one side, means at the tail end of said lure to receive a line, an aperture in the head end of said lure communicating with said recess, a hook having a shank slidably disposed in said aperture, an eye on the inner end of said shank, a portion of said eye being flattened, said aperture being smaller than said eye to prevent inadvertent removal of said hook from said lure, opposed inwardly projecting shoulders in said recess, an elastic band connected to said eye and to said body and a cover plate for said recess whereby said hook may be moved outwardly to tension said band and said flattened portion engaged with one of said shoulders to hold said hook in cocked position and upon contact of a fish with said hook the flattened portion will disengage said shoulder and said hook will be sharply retracted by said band to seat said hook in the fish.

3. A combined fish lure and automatic hook setting mechanism comprising an elongated body, an elongated recess in said body open at one side, means at the tail end of said lure to receive a line, an aperture in the head end of said lure communicating with said recess, a hook having a shank slidably disposed in said aperture, an eye on the inner end of said shank, a portion of said eye being flattened, opposed inwardly projecting shoulders in said recess, resilient tension means connected to said eye and to said body and a cover plate for said recess whereby said hook may be moved outwardly to tension said resilient means and said flattened portion engaged with one of said shoulders to hold said hook in cocked position and upon contact of a fish with said hook the flattened portion will disengage said shoulder and said hook will be sharply retracted by said resilient means to seat said hook in the fish.

4. A combined fish lure and automatic hook setting mechanism comprising an elongated body, an elongated recess in said body, means at the tail end of said lure to receive a line, an aperture in the head end of said lure communicating with said recess, a hook having a shank slidably disposed in said aperture, an eye on the inner end of said shank, a portion of said eye being flattened, an inwardly projecting shoulder in said recess and resilient means interposed between and operatively associated with said eye and said body whereby said hook may be moved outwardly to tension said resilient means and said flattened portion engaged with said shoulder to hold said hook in cocked position and upon contact of a fish with said hook the flattened portion will disengage said shoulder and said hook will be sharply retracted by said resilient means to seat said hook in the fish.

References Cited in the file of this patent

UNITED STATES PATENTS

| | | |
|---|---|---|
| 542,917 | Bardsley | July 16, 1895 |
| 2,204,560 | Allison | June 18, 1940 |
| 2,479,399 | Patten | Aug. 16, 1949 |
| 2,557,030 | Inglis | June 12, 1951 |

FOREIGN PATENTS

| | | |
|---|---|---|
| 859,598 | France | June 10, 1940 |